US005708530A

United States Patent [19]
Huang

[11] Patent Number: 5,708,530
[45] Date of Patent: Jan. 13, 1998

[54] MULTI-ZONED DICHROIC MIRROR FOR LIQUID CRYSTAL PROJECTION SYSTEM

[75] Inventor: Tsai-Yun Huang, Hsin-Chu, Taiwan

[73] Assignee: Electronics Research & Service Organization, Taiwan

[21] Appl. No.: 622,883

[22] Filed: Mar. 29, 1996

[51] Int. Cl.[6] .................................................. G02B 27/14
[52] U.S. Cl. ............................................................ 359/634
[58] Field of Search .................................. 359/634, 583, 359/490

[56] References Cited

U.S. PATENT DOCUMENTS

| | | | |
|---|---|---|---|
| 3,767,290 | 10/1973 | Lang | 359/490 |
| 3,787,610 | 1/1974 | Murphy et al. | 348/101 |
| 3,922,069 | 11/1975 | Kishikawa | 359/633 |
| 4,035,836 | 7/1977 | Miyaji | 358/55 |
| 4,072,405 | 2/1978 | Ozeki | 359/583 |
| 4,161,349 | 7/1979 | Norman | 359/633 |
| 4,857,997 | 8/1989 | Fukami | 358/55 |
| 5,003,214 | 3/1991 | Morris | 313/25 |
| 5,245,449 | 9/1993 | Ooi | 359/40 |
| 5,252,831 | 10/1993 | Weiss | 250/370.11 |
| 5,298,986 | 3/1994 | Owada | 348/762 |

Primary Examiner—Georgia Y. Epps
Assistant Examiner—Ricky Mack
Attorney, Agent, or Firm—Barnes, Kisselle, Raisch, Choate, Whittemore & Hulbert P.C.

[57] ABSTRACT

A multi-zoned dichroic mirror for use in a liquid crystal projection system that is capable producing projected images having improved color uniformity including a dichroic mirror which is divided into at least two regions of a first and a second region, a first region on the dichroic mirror that is coated with a first dichroic coating which compensates for color variations caused by variations in the incident angles of the incident light beams in a positive manner, and a second region on the dichroic mirror coated with second dichroic coating which compensates for color variation caused by variations in the incident angles of the incident light beams in a negative manner.

12 Claims, 4 Drawing Sheets

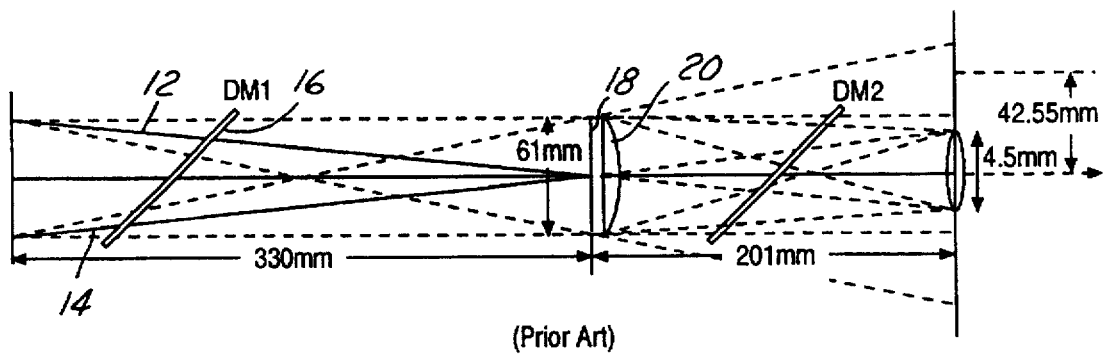
(Prior Art)
FIG.1
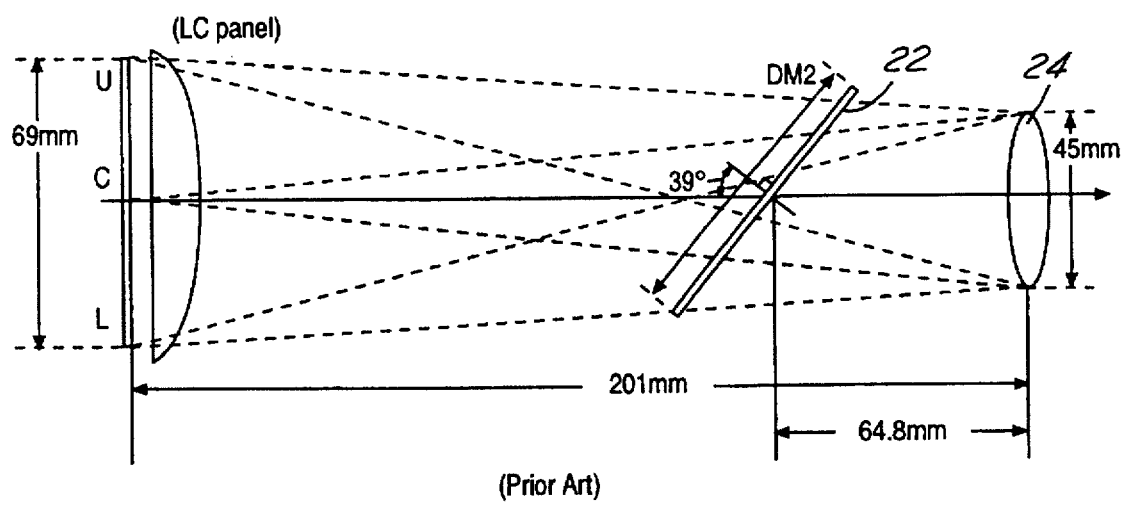
(Prior Art)
FIG.2
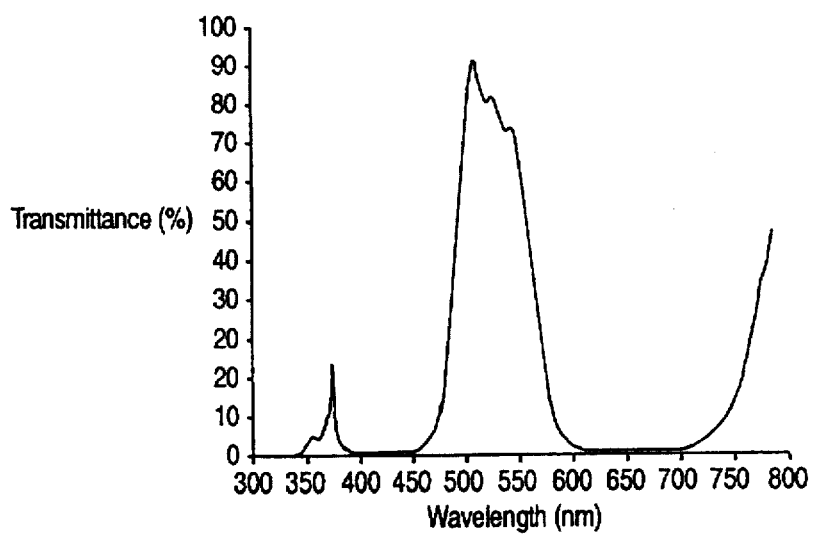
(Prior Art) FIG.3

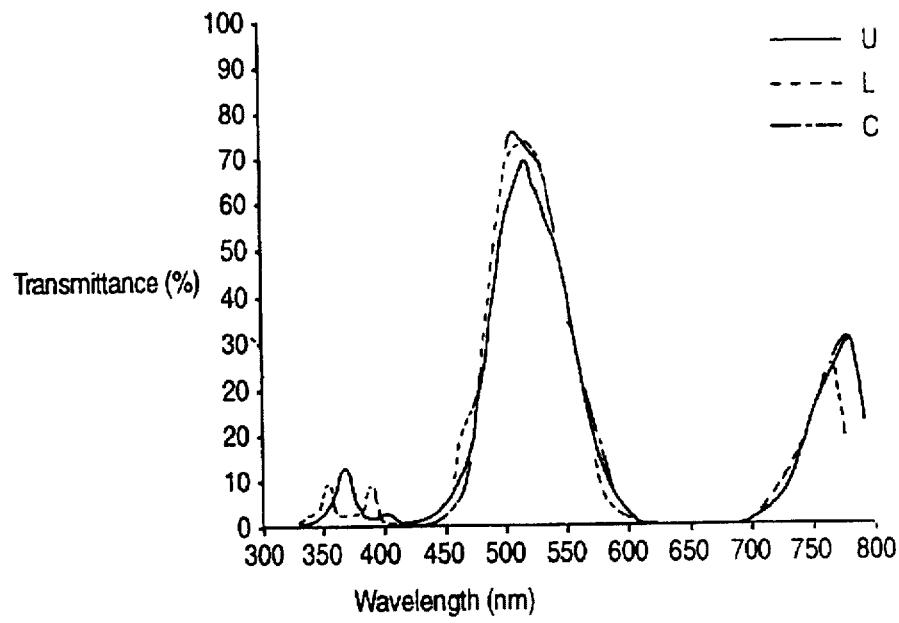
(Prior Art) FIG.10
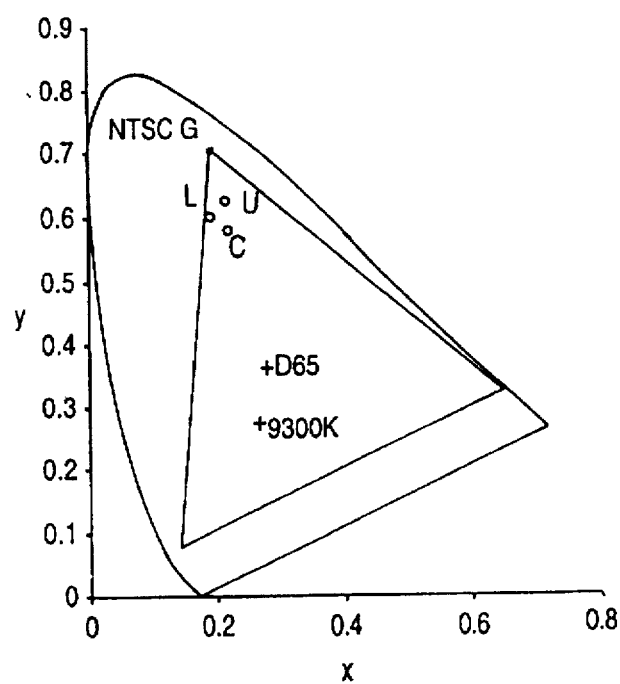
FIG.11

MULTI-ZONED DICHROIC MIRROR FOR LIQUID CRYSTAL PROJECTION SYSTEM

FIELD OF THE INVENTION

The present invention generally relates to a multi-zoned dichroic mirror for use in a liquid crystal projection system and more particularly, relates to a multi-zoned dichroic mirror wherein the surface of the mirror is divided into at least two separate zones each coated with a different dichroic coating such that any color non-uniformity caused by the variations in the incident angles of the incident light beams can be minimized or eliminated.

BACKGROUND OF THE INVENTION

In a conventional three-panels liquid crystal projection system, a dichroic mirror is used to first separate a white light source into red, green and blue color lights. After passing through a liquid crystal panel, the red, green and blue lights are combined together by transmitting through another two dichroic mirrors before it is projected onto a screen by a projection lens. Since the individual light beams from a white light source are not truly parallel beams, at each point on the liquid crystal panel where the beams are passing through, the incident angles of each of the incident light beams optical are different. The different angels of the incident light beams lead to different spectrum of the beams being produced after passing through a dichroic mirror which subsequently, leads to non-uniform color on the projection screen. The reason that the light beams from the white light source are not parallel is caused by the fact that the light source is not a true point source, i.e., the point source of the light does not all fall on the focal point of a parabola shaped reflection mirror. As a result, the light beams reflected by the reflection mirror have divergent angles. This is shown in FIG. 1. When light beams 12 and 14 enters the dichroic mirror 16, different transmittive spectra and reflective spectra are produced. The larger the incident angle of the beams, the more the spectrum will shift toward the shorter wavelength direction. This shifting of the spectra leads to the result of non-uniform color being produced at different locations on the screen, i.e., the same color appears differently at different locations on the screen.

Referring now to FIG. 2 where a dichroic mirror 22, a liquid crystal panel 18, a condenser lens 20, and an entrance pupil 24 of the projection lens system are shown. Assuming that the angle between the normal direction of the dichroic mirror 22 and the optical axis is 39°, the angle (Θ) between the center beam of the light cone at the top and the bottom edge of the liquid crystal panel 18, i.e., (point U and point L) and the center beam of the light cone from the central point on the liquid crystal panel 18, i.e. point C, can be calculated by $$\Theta = \tan^{-1}((69/2)/201) = 9.7394°$$

When the incident angle of the incident light beam is 39°, the transmittive spectrum of the dichroic mirror 22 is shown in FIG. 3. This is used in the present invention as the base, or the uncorrected, spectrum. Assuming that the dichroic mirror 22 is a green light transmittive and red light/blue light reflective mirror, it can be determined that when the incident angle of the incident light beam increases (or decreases) 1°, the spectrum will be shifted toward the shorter wavelength (or the longer wavelength) by 1.4 nm. The incident angles on the dichroic mirror 22 of each of the three light cone received through the condenser lens 20 from point C, U and L on the liquid crystal panel 18 can be calculated by a computer program. The average spectrum of each of the three light cone is then calculated and is shown in FIG. 4. It is seen that the cut-off wavelengths of the left, the right and the center spectra deviates by approximately 13.6 nm. There is a large color variation between the three color spectra as shown by the CIE 1931 (x,y) chromaticity diagram in FIG. 5.

It is therefore an object of the present invention to provide a self-compensating dichroic mirror for use in a liquid crystal projection system that does not have the drawbacks and shortcomings of prior art dichroic mirrors.

It is another object of the present invention to provide a multi-zoned dichroic mirror for use in a liquid crystal projection system that is divided into several zones.

It is a further object of the present invention to provide a multi-zoned dichroic mirror for use in a liquid crystal projection system that is divided into at least two zones each having a different dichroic coating.

It is another further object of the present invention to provide a multi-zoned dichroic mirror for use in a liquid crystal projection system that is divided into at least two zones wherein each zone compensates for color variations caused by variations in the angles of incident light beams on a liquid crystal panel.

It is yet another object of the present invention to provide a multi-zoned dichroic mirror for use in a liquid crystal projection system that is divided into at least two zones such that each zone compensates for color variations resulting in an image projected on a screen that has more uniform color.

It is still another object of the present invention to provide a multi-zoned dichroic mirror for use in a liquid crystal projection system that has three zones divided on the mirror each having a different dichroic coating than the other zones.

It is still another further object of the present invention to provide a multi-zoned dichroic mirror for use in a liquid crystal projection system that is divided into two zones wherein a first zone compensates for color variations in a positive manner and a second zone compensates for color variations in a negative manner.

It is yet another further object of the present invention to provide a multi-zoned dichroic mirror for use in a liquid crystal projection system wherein the color produced by the multi-zoned mirror falls closely on a CIE 1931 (x,y) chromaticity diagram.

SUMMARY OF THE INVENTION

In accordance with the present invention, a multi-zoned dichroic mirror for use in a liquid crystal projection system that is capable of producing projected images with improved color uniformity is provided.

In the preferred embodiment, the dichroic mirror is divided into two zones wherein a first zone is coated with a first dichroic coating which compensates for color variations caused by variations in the angles of incident light beams in a positive manner and a second zone on the mirror which is coated with a second dichroic coating for compensating for color variations caused by the variations in the angles of incident light beams in a negative manner. The color produced by the first and the second zone fall closely on a CIE 1931 (x,y) chromaticity diagram which indicates that the color variations appeared on the screen produced by the two zones are minimized.

In an alternate embodiment, a dichroic mirror is divided into three zones for use in a liquid crystal projection system to produce projected images having improved color uniformity which includes a first region on the dichroic mirror coated with a first dichroic coating, a second region on the mirror coated with a second dichroic coating, and a third region on the mirror coated with a third dichroic coating. Each coating compensates for the color variations caused by the variations in the angles of incident light beams such that uniform color is produced by the three zones.

The dichroic coating are formed generally by thin layers of titanium oxide and silicon oxide that are stacked together in a total of between 20 to 40 layers thickness. The thin films are coated on a glass or other suitable substrate. Most dichroic mirrors are only transmittive to a single color of either red, green or blue.

BRIEF DESCRIPTION OF THE DRAWINGS

Other objects, features, and advantages of the present invention will become apparent upon consideration of the specification and the appended drawings in which:

FIG. 1 is a schematic view of a prior art liquid crystal projection system utilizing dichroic mirrors.

FIG. 2 is an enlarged schematic view of the liquid crystal projection system shown in FIG. 1.

FIG. 3 is a graph showing a standard transmittance versus wavelength curve for a green light.

FIG. 10 is graph showing compensated transmittance versus wavelength curves produced by the dichroic mirror shown in FIG. 9.

FIG. 11 is a CIE 1931 chromaticity diagram showing an improved color uniformity of the three separate points of FIG. 10.

DETAILED DESCRIPTION OF THE PREFERRED AND THE ALTERNATE EMBODIMENTS

The present invention provides a multi-zoned dichroic mirror for use in a liquid crystal projection system wherein the mirror is divided into at least two zones capable of producing projected images having improved color uniformity.

Figure 6:
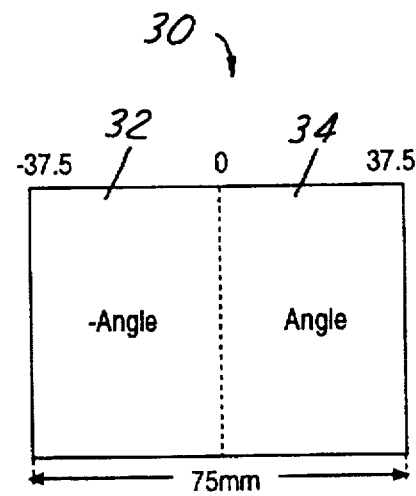
FIG. 6 is a plane view of the preferred embodiment of the present invention dichroic mirror wherein the mirror is divided into two dichroic zones.

Referring now to FIG. 6, wherein a present invention dichroic mirror 30 that is divided into two zones of 32 and 34 is shown. The two zones 32 and 34 each having a different dichroic coating. A dichroic coating is normally formed by 20-40 layers alternately of a thin film that has a high refractive index and a thin film that has a low refractive index. In the present invention, the thin films are coated on a glass plate or other suitable substrates. It is important that the materials used for the thin films should have coefficients of thermal expansion close to that of the glass plate such that warpage or delamination does not occur upon temperature changes. The present invention dichroic coating is formed by utilizing a high refractive index material of titanium oxide (refractive index=2.55) and low refractive index material of as silicon oxide (refractive index=1.46). By suitably selecting the film thickness and the number of layers, incident light beams that have any incident angles can be treated to transmit or reflect in certain wavelength range.

Figure 4:
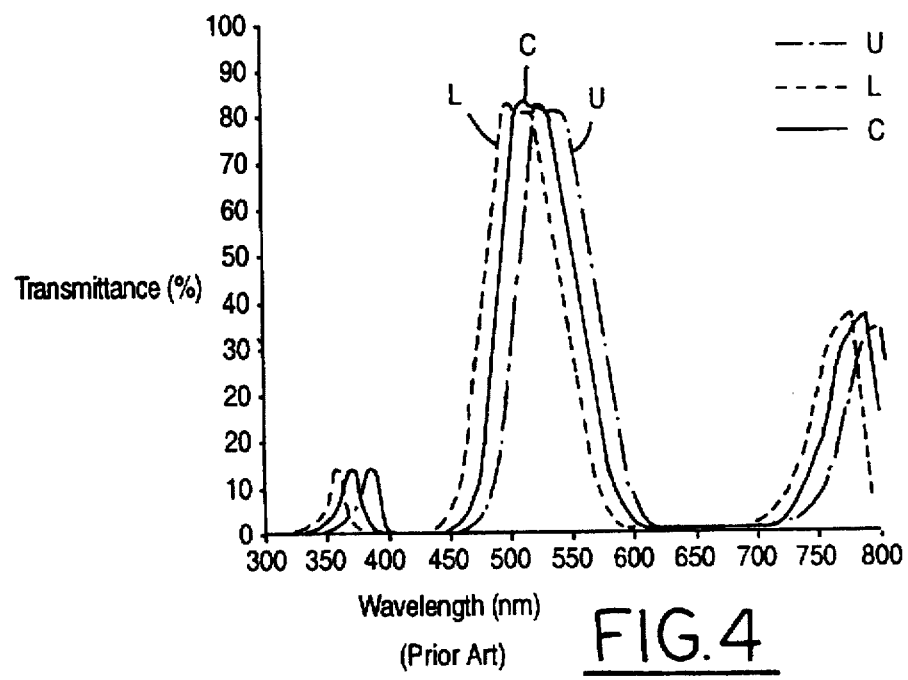
FIG. 4 is a graph showing transmittance versus wavelength curves produced by a prior art liquid crystal projection system.
Figure 5:
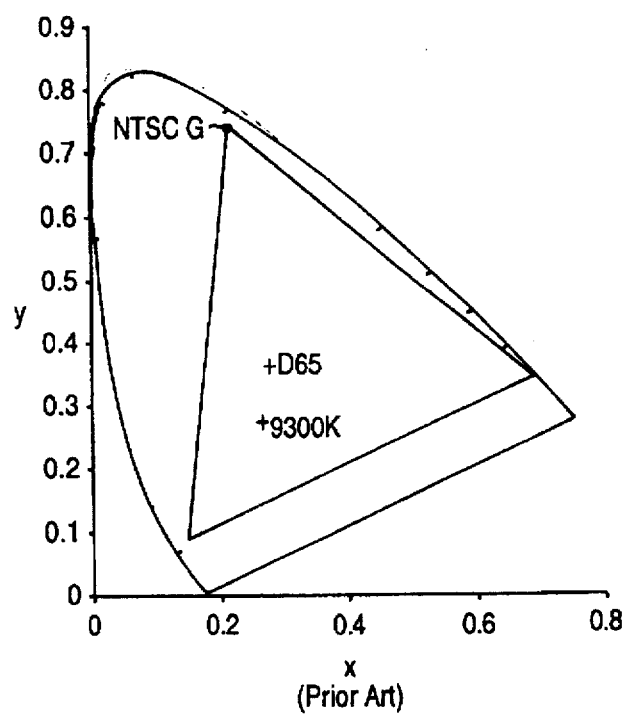
FIG. 5 is a graph showing a CIE 1931 chromaticity diagram for the colors represented by the three curves in FIG. 4.
Figure 7:
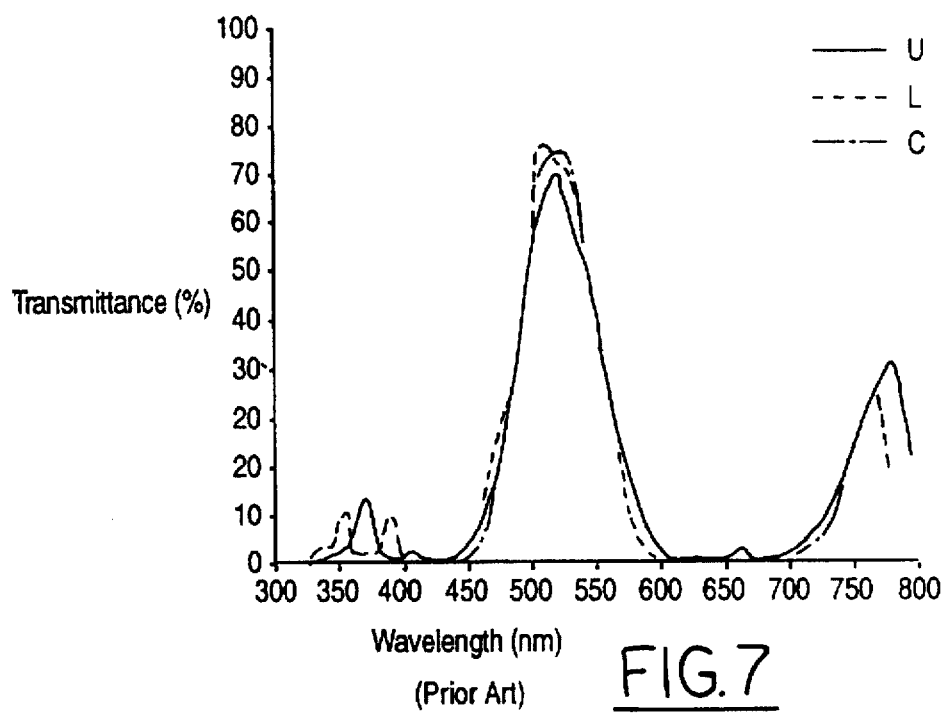
FIG. 7 is a graph showing compensated transmittance versus wavelength curves produced by the dichroic mirror of FIG. 6.
Figure 8:
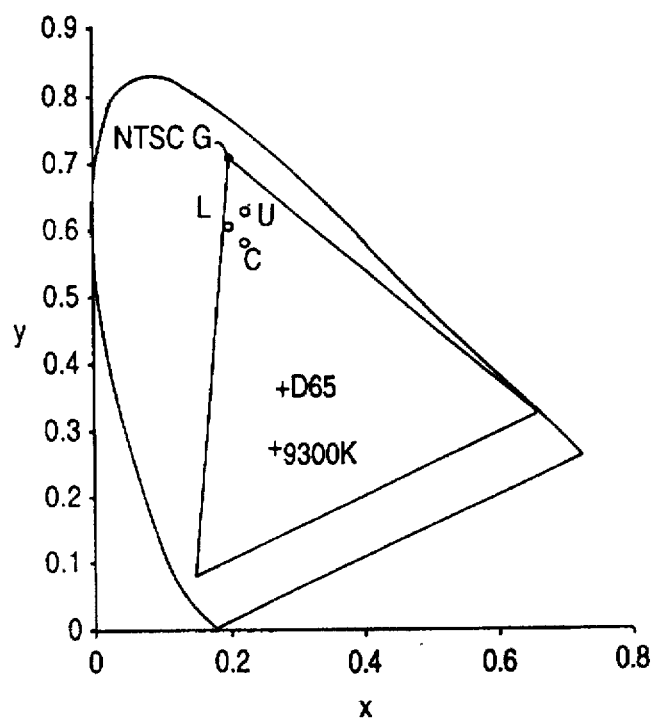
FIG. 8 is a CIE 1931 chromaticity diagram showing an improved color uniformity of the three separate points compensated by the present invention dichroic mirror.

As shown in FIG. 6, the dichroic mirror 30 has a length of approximately 75 mm and the coordinate at the center of the mirror is 0. At between −37.5 mm to 0 mm, the dichroic coating has a spectrum as that shown in FIG. 3 but is shifted toward the longer wavelength in an amount of (Angle×(1.4 nm/deg)). It should be noted that 1.4 nm/deg is an average deviation. For green light, the range of deviation is between about 1.2 and about 1.7 nm/deg. For all color lights, the range of deviation is between about 1.0 and about 2.0 nm/deg. At between 0 mm and 37.5 mm, the spectrum is shifted toward the shorter wavelength by (Angle×(1.4 nm/deg)). Therefore, when Angle=10°, the three spectrum of FIG. 4 are pulled closer together as shown in FIG. 7. The relative color coordinate on a CIE 1931 chromaticity diagram are shown in FIG. 8. When FIG. 7 is compared to FIG. 4 (prior art), it is clear that the three spectra are much closer together and therefore more uniform color at different points on the screen is achieved. The same conclusion can be drawn by comparing the graph of FIG. 8 with that of FIG. 5. FIG. 8 shows the color coordinates of point U, point L, and point C are much closer together than those shown in FIG. 5.

Figure 9:
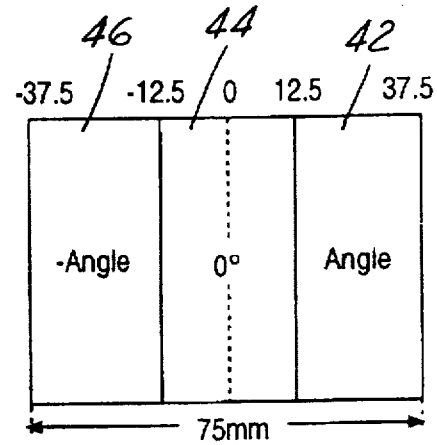
FIG. 9 is a plane view of the alternate embodiment of the present invention dichroic mirror wherein the mirror is divided into three dichroic zones.

In an alternate embodiment, the dichroic mirror is divided into three zones as shown in FIG. 9. Dichroic mirror 40 is divided into zones 42, 44 and 46. In zone 42 (between 12.5 mm and 37.5 mm), the dichroic coating for transmittance is the same as the transmittance spectrum coated in the zone between −12.5 and 12.5 mm (the spectrum for the incident angle of 39°). The spectrum is shifted toward the shorter wavelength by an amount of (Angle×(1.4 nm/deg)). The spectrum at −12.5 to −37.5 mm is shifted toward the longer wavelength by an amount of (Angle×(1.4 nm/deg)). The three spectra of point U, point C, and point L are shown in FIG. 10 which indicate a great improvement from that of the preferred embodiment shown in FIG. 7 and that of the prior art shown in FIG. 4. The color coordinates (x,y) of the three spectra is shown in FIG. 11 which also indicates that the three coordinates are close together.

The present invention therefore has demonstrated that by dividing a dichroic mirror into at least two zones and then coating with different dichroic coatings, the problem of color variations on the screen caused by the variation in the incident angles of the incident light beams can be minimized or eliminated.

While the present invention has been described in an illustrative manner, it should be understood that the terminology used is intended to be in a nature of words of description rather than of limitation.

Furthermore, while the present invention has been described in terms of a preferred embodiment and one alternate embodiment thereof, it is to be appreciated that those skilled in the art will readily apply these teachings to other possible variations of the inventions. For instance, a dichroic mirror may be divided into more than three regions to achieve even more improved results that those shown by the dichroic two and three regions.

The embodiments of the invention in which an exclusive property or privilege is claimed are defined as follows:

1. A dichroic mirror for use in a liquid crystal projection system to produce projected color images comprising:

a dichroic mirror divided into at least two regions characterized by a first region and a second region, said first region on said dichroic mirror coated with a first dichroic coating, said first dichroic coating compensates for color variations caused by the variations in the angles of incident light beams by shifting a spectrum toward a longer wavelength, and said second region on said dichroic mirror coated with a second dichroic coating, said second dichroic coating compensates for color variations caused by the variations in the angles of incident light beams by shifting said spectrum toward a shorter wavelength.

2. A dichroic mirror according to claim 1, wherein for each increased degree of the angle of the incident light beam, the spectrum is shifted toward a shorter wavelength by between 1.0 nm and 2.0 nm.

3. A dichroic mirror according to claim 1, wherein for each decreased degree of the incident angle of the incident light beams, the spectrum is shifted toward a longer wavelength by between 1.0 nm and 2.0 nm.

4. A dichroic mirror according to claim 1, wherein said first dichroic coating generates a spectrum which shifts toward a longer wavelength in an uncorrected spectrum.

5. A dichroic mirror according to claim 1, wherein said second dichroic coating generates a spectrum which shifts toward a shorter wavelength in an uncorrected spectrum.

6. A dichroic mirror according to claim 1, wherein said first and said second dichroic coating comprise alternating layers of titanium oxide and silicon oxide.

7. A dichroic mirror according to claim 1, wherein said first and said second dichroic coating are each deposited on a glass substrate.

8. A dichroic mirror according to claim 1, wherein said first and said second dichroic coating have a total of between 20 layers and 40 layers of titanium oxide and silicon oxide.

9. A dichroic mirror for use in a liquid crystal projection system for producing projected color images comprising:

a dichroic mirror divided into three regions characterized by a first, a second, and a third region, said first region on said dichroic mirror coated with a first dichroic coating, said first dichroic coating compensate for colored variations caused by variations in the incident angles of incident light beams in a first manner, and said second region on said dichroic mirror coated with a second dichroic coating, said second dichroic coating compensates for color variation caused by variations in the incident angles of incident light beams in a second manner, and said third region on said dichroic mirror situated in between said first and said second regions coated with a third dichroic coating, which does not compensate for color variation.

10. A dichroic mirror according to claim 9, wherein said three regions are of approximately equal area.

11. A dichroic mirror according to claim 9, wherein said first dichroic coating compensate for color variations by generating a spectrum which shifts toward a longer wavelengths.

12. A dichroic mirror according to claim 9, wherein said second dichroic coating compensate for color variations by generating a spectrum which shifts toward a shorter wavelength.

\* \* \* \* \*